(12) United States Patent
Maschietti et al.

(10) Patent No.: US 7,429,126 B2
(45) Date of Patent: Sep. 30, 2008

(54) RESIDUAL LIFETIME INDICATOR FOR PERISHABLE CONSUMER PRODUCTS

(75) Inventors: Marco Maschietti, Rome (IT); Marco Bianchini, Rome (IT)

(73) Assignee: Montalbano Industria Agroalimentare S.p.A., Lamporecchio (IT)

( * ) Notice: Subject to any disclaimer, the term of this patent is extended or adjusted under 35 U.S.C. 154(b) by 0 days.

(21) Appl. No.: 11/944,455

(22) Filed: Nov. 22, 2007

(65) Prior Publication Data

US 2008/0084912 A1 Apr. 10, 2008

Related U.S. Application Data

(63) Continuation of application No. PCT/EP2006/060908, filed on Mar. 21, 2006.

(30) Foreign Application Priority Data

Jun. 30, 2005 (IT) ............... GE2005A0037

(51) Int. Cl.
*G01K 3/00* (2006.01)
*G01K 5/00* (2006.01)
*G01K 1/00* (2006.01)
(52) U.S. Cl. ............... 374/102; 374/106; 374/190; 116/217
(58) Field of Classification Search ............... 374/102, 374/106, 190; 116/217
See application file for complete search history.

(56) References Cited

U.S. PATENT DOCUMENTS 3,414,415 A * 12/1968 Broad, Jr. ............... 116/219
3,946,611 A * 3/1976 Larsson ............... 374/106
3,996,007 A * 12/1976 Fang et al. ............... 422/58
4,382,700 A * 5/1983 Youngren ............... 374/102
4,408,557 A * 10/1983 Bradley et al. ............... 116/206
4,432,656 A * 2/1984 Allmendinger ............... 374/102
6,741,523 B1 * 5/2004 Bommarito et al. ......... 368/327
6,968,804 B1 * 11/2005 Barbieri et al. ............... 116/219
2003/0214997 A1 * 11/2003 Diekmann et al. .......... 374/102

FOREIGN PATENT DOCUMENTS

JP 59 204728 A 11/1984

* cited by examiner

*Primary Examiner*—Edward Lefkowitz
*Assistant Examiner*—Mirellys Jagan
(74) *Attorney, Agent, or Firm*—Matthias Scholl P.C.; Matthias Scholl

(57) ABSTRACT

Taught is a residual lifetime indicator for perishable consumer products, comprising a material which displays a property variable with varying temperature in accordance with a given function, actuating means which act on the material so as to make it exhibit the aforesaid property, and indicator means linked to the material/actuating means combination, the indicator means indicating the residual lifetime relative to the expiry date of the product; the material is a fluid (102; 114) of viscosity variable as a function of the temperature, which flows in a pipe (2, 212; 4, 134) having a given cross-section, the actuating means comprising a device (311, 601, 411, 701; 313, 203, 113, 204) capable of applying an essentially constant pressure on said fluid (102, 114), the flow of said fluid being linked to said indicator means (701, 413).

13 Claims, 2 Drawing Sheets

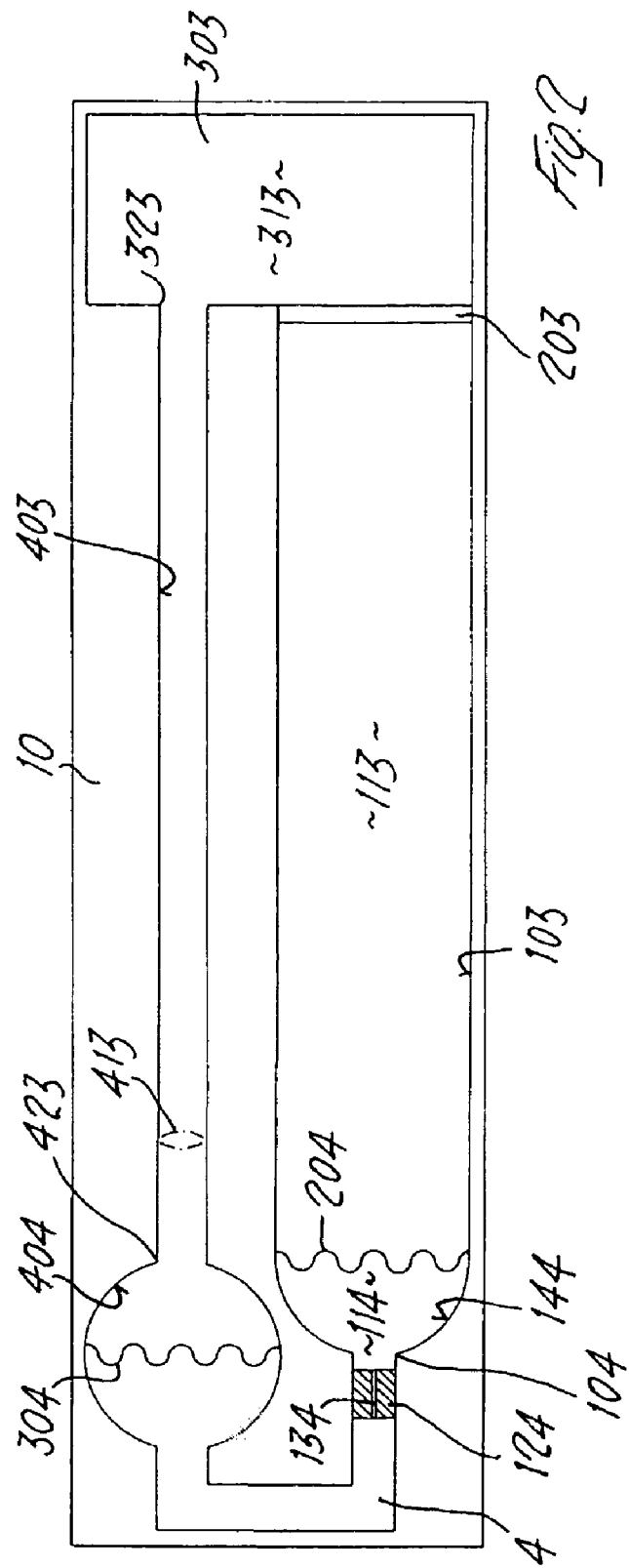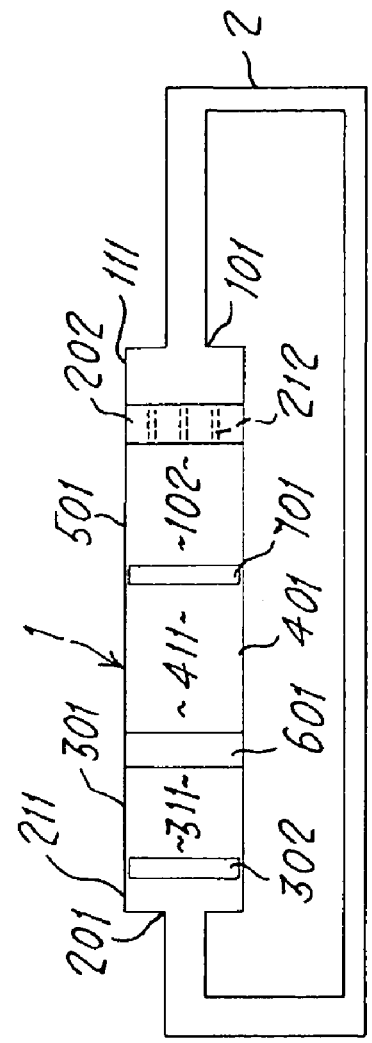

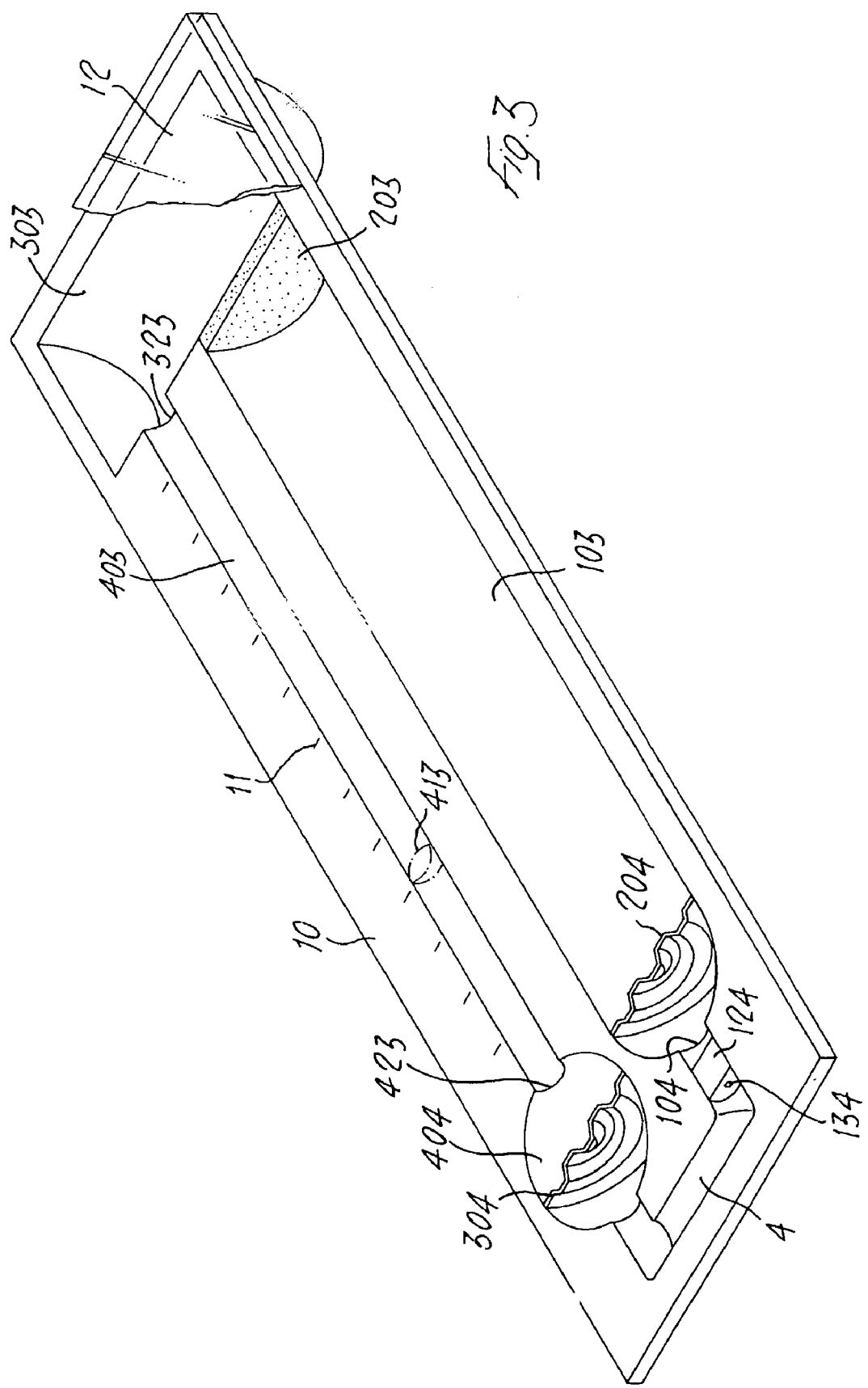

RESIDUAL LIFETIME INDICATOR FOR PERISHABLE CONSUMER PRODUCTS

CROSS-REFERENCE TO RELATED APPLICATIONS

This application is a continuation of International Patent Application No. PCT/EP2006/060908, with an international filing date of Mar. 21, 2006, which is based on Italian Patent Application No. GE2005A000037, filed Jun. 3, 2005. The contents of these specifications are incorporated herein by reference.

BACKGROUND OF THE INVENTION

1. Field of the Invention

This invention concerns systems for the assessment of the influence of variations in temperature on perishable products, and in particular concerns a residual lifetime indicator device for consumer products, including food products.

2. Description of the Related Art

The majority of industrial products, and in particular the products of the food and agricultural and pharmaceutical industry, have properties which perish, until they reach zero, within a given time period, which is generally shown as the validity or expiry date of the product. It should however be stated that generally, as is often stated on the packs of the products, this date refers to the intact product stored in an optimal manner; however it is not always possible for the consumer to establish whether the product has been stored in the most appropriate way before its purchase.

From U.S. Pat. No. 5,531,180, a device is known which is capable of recording the temperature variation which a product, in particular a deep-frozen product, has undergone, and to indicate its extent by suitable means. However, this device does not provide any assessment as to the remaining effective life of the product, and thus the information it records is difficult to communicate to and understand by the consumer, who normally has neither the knowledge nor the technical means to carry out assessments of this type.

In WO 99/044021, a time-temperature indicator is described wherein a small bar of a given material is subjected to a traction load, for example from a spring, and the given material is capable of varying its response to the traction depending on the temperature. In this way, by appropriately selecting the stretchable material and the means for subjecting it to a traction load, it is possible to obtain a device which provides information concerning the residual lifetime of the product to which the device was linked. However, with regard to practical application, this type of solution presents a series of difficulties connected mainly to the selection of the materials in question; in the first place, considerable difficulties in calibrating the indicator can also arise. Moreover, many of the materials can turn out to be toxic or at any rate noxious, and poorly suited to a device intended for use on food or pharmaceutical products. Finally, this device exhibits substantial complications in order to obtain an irreversible indication of the residual lifetime of the product.

BRIEF SUMMARY OF THE INVENTION

The purpose of this invention is thus to provide a device which is capable of providing an indication, easily readable by the consumer, of the residual life-time of the products with indication of the expiry date, adaptable to products of varying nature, capable of providing a reliable and non-reversible indication, and of low production cost; further, the device must be made of non-toxic materials, must be of modest size, and must be difficult to tamper with.

An object of this invention is thus a residual lifetime indicator device for perishable consumer products, comprising a material which displays a property variable with variation of the temperature according to a given function, actuating means which act on the material so as to make it exhibit the aforesaid property, and indicator means linked to the material/actuating means combination, wherein the indicator means indicates the residual lifetime with respect to the expiry date of the product; the material is a fluid of viscosity varying as a function of the temperature, which flows in a pipe of a given cross-section, the actuating means comprise a device capable of applying an essentially constant pressure onto the fluid, and the flow of the fluid is linked to the indicator means.

The device capable of applying a constant pressure on the fluid can comprise a solvent/solution osmotic couple separated by a semipermeable membrane and connected, via two mobile means of separation located at its ends, to the two ends of the pipe in which the fluid of variable viscosity is located. In one embodiment, the indicator device comprises a chamber which contains: a saline solution separated from the solvent by a semipermeable membrane, and connected, via an impermeable mobile partition, to the fluid of variable viscosity; means capable of causing a localized pressure drop which open into a pipe connected to the end of the chamber in which the solvent is located, a mobile and impermeable partition being positioned between the fluid of variable viscosity and the solvent; the mobile partition positioned between the saline solution and the fluid of variable viscosity can function as an indicator means.

Preferably, the fluid of variable viscosity is a fluid of high viscosity, of the order of thousands of centipoises. In one practical version of the invention, the fluid of variable viscosity is immiscible with the osmotic couple, and the interface between the immiscible phases can constitute the indicator means.

BRIEF DESCRIPTION OF THE DRAWINGS

Further advantages and characteristics of the device according to this invention will become clear from the following detailed description of one embodiment of the same, made for illustrative and non-limiting purposes with reference to the appended drawings, wherein:

FIG. 1 is a schematic representation in plan of a first embodiment of the indicator device according to this invention;

FIG. 2 is a view in plan of a second embodiment of the device of the invention; and FIG. 3 is a perspective view of the device illustrated in FIG. 2.

DETAILED DESCRIPTION OF THE INVENTION

In FIG. 1, a first embodiment of the device according to this invention is shown schematically: 1 indicates a container, equipped at its ends with two apertures 101 and 201 connected to the pipe 2. The container 1 is subdivided within into a series of chambers; the semipermeable membrane 601 separates the chamber 301, in which the pure solvent 311 is contained, from the saline solution 411 contained in the chamber 401. The partition 302 which represents the other end of the chamber 301 is mobile and its other face is turned towards the chamber 211 connected to the aperture 201 turned towards the pipe 2. The partition 701 which defines the chamber 401 is also mobile, and bounds the chamber 501 in which the viscous fluid 102 is contained, which is connected, via the septum 202, to the chamber 111 and hence to the pipe 2 via the aperture 101.

The functioning of the device illustrated in FIG. 1 will appear clear from what follows. As already stated above, the purpose of the indicator device of the invention is to provide a measurement of the passage of time assigning different weightings to the intervals of time passed at different storage temperatures of the product to which the device is attached. For this purpose, the mobile partition 701 located between the chamber 401 and the chamber 501 is displaced towards this latter chamber by the osmotic pressure caused by the passage of the solvent 311 towards the saline solution 411. The displacement of the mobile partition 701 is also a function of the viscosity of the fluid 102, which is pushed, by the action of the mobile partition 701, through the channels or the channel 212 of the partition 202 into the pipe 2. The fluid must display a considerable variation in viscosity with varying temperature, so that its flow is appreciably affected by even minimal variations; the viscosity must decrease with increasing temperature, such that the indicator, namely the mobile partition 701, moves more quickly when the temperature increases. The fluid must, moreover, have a viscosity which is at any rate very high, of the order of several thousands of centipoises, so that the forward movements of the indicator are very slow.

Advantageously, the fluids which display higher viscosity values are also those which undergo the effect of increasing temperature to a greater extent; in the cases illustrated here, the use of glycerin, which displays viscosity values lying between 11,000 centipoises at 0° C. and 950 centipoises at 25° C. was preferred.

To ensure that the osmotic effect does not diminish, it suffices to select a salt which can be used in the device under saturation conditions and in the presence of undissolved solid. In this manner, the solvent, in particular water, that passes through the semipermeable membrane will go to dissolve a quantity of salt such as to maintain the concentration of the solution essentially constant.

At this point, it is important to establish which parameters influence the velocity of the forward movement of the mobile partition 701 which, as was defined above, is influenced both by the osmotic pressure of the solvent/solution couple and by the viscosity of the fluid 102. Assuming that only one minichannel 212 passes through the partition 202, the velocity of forward movement of the mobile partition 701 $v_p$ is calculated as:

$$v_p = \frac{\upsilon R A C_s V_w T}{1 + \frac{8ALSV_w\mu(T)}{\pi r^4}} \quad (1)$$

where:
$\upsilon$=number of chemical species present in the solution following the dissolution of the solute R=general gas constant;
A=parameter depending on the characteristics of the membrane;
$C_s$=concentration of the solution;
$V_w$=specific molar volume of the solvent;
T=temperature;
L=length of the minichannel 212 of the partition 202;
r=radius of the minichannel 212;
S=cross-section of the semipermeable membrane 601, corresponding to the internal cross-section of the container 1, and $\mu(T)$=viscosity of the fluid, variable as a function of the temperature.

On the basis of this equation (1), it is clear that a considerable influence is exerted on the value of the velocity of forward movement $v_p$ both by the concentration of the solution, which is however constant with respect to the temperature, and by the viscosity of the fluid 102, which varies in a consistent manner with respect to the temperature. As regards the influence of the concentration, it can be stated that the equation (1) is designed for solutions which are not of high concentration, but that it can be adapted to other situations without changing its essential nature. Taking an example with the following reference parameters:

$\upsilon$=2
Cs=0.05 M
S=1 cm$^2$
L=1 cm
r=0.005 cm
A=1.3×10$^{-6}$ mol.sec$^{-1}$.cm$^{-2}$.atm$^{-1}$ and using glycerin as the viscous fluid, it will be possible to pass from $v_p$=0.58 cm/day at a temperature of 4° C. to $v_p$=0.984 cm/day at a temperature of 10° C. This extremely marked variation in forward velocity thus makes it possible to construct a suitable correlation, exploiting the parameters of the device in a suitable manner, between the forward velocity of the indicator and the effective lifetime of the product with variation in the storage temperature. In practice, for each product for which a "consumption lifetime" is known and a defined rate of decline of its properties correlated with the storage temperature, it is a matter of creating an indicator which takes account of these characteristics.

The embodiment of the device described above in fact has a number of disadvantages: in the first place, the mobile partition which functions as the indicator could be subject to friction in its movement, and hence the indication provided could be less accurate than theoretically predicted. Moreover, it can be difficult to find a saline solution under saturation conditions which is appropriate to the duration for each specific product, bearing in mind also the non-toxicity requirements that the device will have to meet.

In FIG. 2, a second embodiment of the indicator device according to this invention is shown schematically: in the support sheet 10, preferably of pressable material, a chamber 103 is formed, which contains a saline solution 113, connected via a semi-permeable membrane 203 to a chamber 303 containing the solvent 313 of the same solution, in this case water. The chamber 303 is connected via an aperture 323 to the pipe 403, in which is positioned the mobile indicator 413, in this case an air bubble. At the opposite end of the chamber 103 to that in which the membrane 203 is positioned, a flexible membrane 204 is located, which transmits the variations in pressure in the chamber 103 to the viscous fluid 104, which flows from the portion 144 of the chamber 103, via the aperture 104 and the capillary duct 134 made in the septum 124, into the pipe 4. At the opposite end of the pipe 4 located is an expansion chamber 404 subdivided into two parts by the flexible membrane 304, which in fact separates the viscous fluid 114 from the solvent 313 contained in the pipe 403, which is connected to the chamber 404 via the aperture 423.

The operation of the indicator device according to the second embodiment takes place as follows. In this case, the pressure is transferred from the osmotic couple to the viscous fluid and from this again to the solvent of the osmotic couple, but this time across flexible membranes. These membranes, i.e. the membranes 204 and 304, must be capable of presenting minimal resistance to the pressure exerted on them, and hence must display an essential zero tension.

The passage of the solvent from the chamber 303 across the semipermeable membrane 203 causes the displacement of the membrane 204 which thus exerts pressure on the viscous fluid 114, this latter passes through the capillary duct 134 made in the septum 124 and emerges into the pipe 4, through which it reaches the chamber 404 and the flexible membrane 304. The pressure at this point is transferred to the column of solvent 313 present in the pipe 403, into which the indicator element 413 has been introduced. The viscous fluid, which is also glycerin in this case, undergoes the influence of the temperature variations of the surroundings, and its flow through the capillary 134 is influenced by this. The indicator 413 can be created, as described, as an air bubble inserted into the solvent, which can be suitably colored to provide an appropriate means of contrast. Alternatively, the chamber 404 can be filled, from the part facing the pipe 403, with a liquid immiscible with water, and preferably colored, in such a manner that the interface between the two liquids functions as an indicator for the device according to this embodiment of the invention.

The velocity of displacement of the indicator in the pipe 403 can be calculated according to the following equation:

$$v_p = \frac{2RAC_sV_wST}{\pi r_2^2\left(1 + \frac{8ALSV_w\mu(T)}{\pi r_1^4}\right)} \quad (2)$$

which displays a substantial similarity to the equation (1) given for the embodiment described previously, except for the fact that here a term relating to the dimensions of the pipe 403 appears in the denominator, namely its radius $r_2$, thus named to distinguish it from the radius of the capillary duct n; apart from this, the cross-section S refers to the cross-section of the semipermeable membrane 203, while the length L is that of the capillary duct 134. In general, the indicator will move in the pipe at a velocity comparable to that found for the device according to the first embodiment of the invention.

The advantages which appear quite clearly for the embodiment described above in the first place consist in the fact that the indicator, being physically decoupled from the means which transmit the variation in pressure from one fluid to the other, does not display risks of friction which could falsify its response capacity. Furthermore, the adoption of the flexible membranes in place of the mobile partitions makes the device much simpler in design and more reliable in function.

It should also be noted that the geometry utilized in this embodiment makes it possible to obtain a practically constant osmotic effect without the need to use a saline solution under saturation conditions. In fact, the initial volume of the saline solution is much greater than the volume of water displaced in the complete travel of the indicator, which may be about 3-8% of the initial volume of the solution. Consequently, the fall in osmotic pressure due to the dilution of the saline solution is of the order of about 3-8% relative to the osmotic pressure measurable at the start. This effect can confidently be regarded as negligible, with the consequence that any saline solution can be used at the desired concentration: this allows a more manageable and wider calibration range for the device.

In general, it can be said that when defining the characteristics of the device for a given product, account will be taken of the concentration of the salt to reflect the standard lifetime of the product, in other words its period of commercial validity at an essentially constant storage temperature: with regard to the aspect connected with decreases in the product lifetime caused by increases in temperature, however, the choice of the viscous liquid will be critical.

In FIG. 3, an indicator device created in accordance with the embodiment described above is illustrated: the same numbers correspond to the same components. As can be seen, the chamber 303 for the solvent, the chamber 103 for the solution, the compensating chamber 404 and the pipes 4 and 403 have been pressed in a single operation in the sheet 10 of pressable material. The chamber 303 is semicylindrical, just as the chamber 103 is a semicylindroid which at one end has a hemi-spherical segment; the chamber 404 is hemispherical and the pipes 4 and 403 are semicylindrical. The semi-permeable membrane 203 and the flexible membranes 204 and 304 are inserted in the appropriate positions. Similarly, the semicylindrical septum 124, in which the capillary 134 is created eccentrically, is located at the entrance of the pipe 4. In the plane of the sheet 10, close to the edge of the pipe 403, executed in one piece with the sheet 10 or applied onto the same, is located a graduated reference scale 11, so as to improve the readability of the indication provided. Above the device as illustrated, appropriately filled with solvent, saline and viscous fluid, a layer of rigid, transparent material 12 is then positioned, which provides protection and renders tampering with the device almost impossible.

In a further practical version of the invention, it can be provided that the viscous fluid is immiscible both with the solvent and with the solution used in the indicator device of the invention; in this case it will be possible to avoid installing the mobile impermeable partitions intended to separate the viscous fluid from the solvent/solution couple. Moreover, the interface between the viscous fluid and the solvent will itself constitute the indicator means, and for this purpose the solvent or the viscous fluid can be given an appropriate coloration, so as subsequently to make the indication provided prominently visible.

This invention is not to be limited to the specific embodiments disclosed herein and modifications for various applications and other embodiments are intended to be included within the scope of the appended claims. While this invention has been described in connection with particular examples thereof, the true scope of the invention should not be so limited since other modifications will become apparent to the skilled practitioner upon a study of the drawings, specification, and following claims.

All publications and patent applications mentioned in this specification are indicative of the level of skill of those skilled in the art to which this invention pertains. All publications and patent applications mentioned in this specification are herein incorporated by reference to the same extent as if each individual publication or patent application mentioned in this specification was specifically and individually indicated to be incorporated by reference.

What is claimed is:

1. A residual lifetime device for a perishable consumer product, comprising
    a material which displays a property variable with varying temperature in accordance with a given function;
    actuating means which acts on said material so as to make it exhibit said property; and
    indicator means linked to said material and said actuating means, said indicator means indicating the residual lifetime relative to an expiry date of the product; wherein
    said material is a fluid (102; 114) having a viscosity variable as a function of the temperature;

said material flows in a first pipe (2, 212; 4, 134) having a cross-section;

said actuating means comprises a device (311, 601, 411, 701; 313, 203, 113, 204) capable of applying an essentially constant pressure on said fluid (102, 114), the flow of said fluid being linked to said indicator means (701, 413); and said indicator capable of applying a constant pressure on said fluid (102, 114) comprises a solvent/solution osmotic couple (311, 411; 313; 113) separated by a semipermeable membrane (601; 203) and connected, via mobile separation means (302, 701; 204, 304) positioned at the ends of containing means (301, 401; 403, 303, 103) of said osmotic couple (311, 411; 313; 113), to the two ends of the first pipe (2; 4) in which the fluid (102; 104) having variable viscosity is placed.

2. The indicator of claim 1, wherein said fluid having viscosity variable as a function of the temperature (102; 114) is immiscible both with the solvent (311;313) and with the solution (411; 113), said means of separation being constituted of the separation interface between the said mutually immiscible phases.

3. The indicator of claim 1 wherein said mobile means of separation (701) placed between the solution (411) and the fluid (102) of variable viscosity functions as the indicator means.

4. The indicator of claim 1, wherein said said solvent/solution osmotic couple is a water/solution osmotic couple.

5. The indicator of claim 1, further comprising a container (1; 10) wherein a first chamber (401; 103) is defined, which contains a solution (411;113) separated from the solvent (311; 313) placed in a second chamber (301; 303), via a semipermeable membrane (601; 203), and connected, via mobile separation means (701; 204), to a third chamber (501; 144) in which disposed is a fluid (102;114) of variable viscosity, said third chamber (501; 144) being connected, via means 202, 212; 124, 134) capable of causing a localized pressure drop, to said first pipe (2; 4) connected at its opposite end to said second chamber (301; 403, 303) in which disposed is the solvent (311; 313), mobile means of separation (302; 304) being provided between said fluid (102; 114) of variable viscosity and said solvent (311; 313).

6. The indicator of claim 5, wherein said mobile means of separation are rigid partitions (302, 701) sliding hermetically in the interior of said container (1).

7. The indicator of claim 5, wherein said solution (411) is a saturated aqueous solution of a solute, in the presence of an undissolved solid.

8. The indicator of claim 5, wherein said means capable of causing a localized pressure drop comprises a septum (202) provided with one or more minichannels (212).

9. The indicator of claim 5, wherein said mobile means of separation (304) placed between said fluid (114) of variable viscosity and said solvent (313) is positioned in a compensation chamber (404) placed downstream of said first pipe (4) filled with said fluid (114) and upstream of a second pipe (403) of given length and cross-section, which is connected to said second chamber (303) containing said solvent (313), said indicator means (413) being positioned in the interior of said second pipe (403).

10. The indicator of claim 9, wherein said mobile means of separation comprises flexible membranes (204, 304).

11. The indicator of claim 10, wherein said indicator means comprise an air bubble (413).

12. The indicator of claim 10, wherein said indicator means comprises a liquid immiscible with the solvent, said liquid and/or said solvent being of a suitable coloration.

13. The indicator of claim 10, wherein said solution (411; 113) is a saline solution at a given concentration of a salt that is edible or at least not harmful.

\* \* \* \* \*